(12) United States Patent
Graversen et al.

(10) Patent No.: US 12,465,247 B2
(45) Date of Patent: Nov. 11, 2025

(54) IDENTIFICATION AND QUANTIFICATION OF THE DEGREE OF TISSUE HYPOXIA

(71) Applicants: Roche Diagnostics A/S, Copenhagen V (DK); AALBORG UNIVERSITET, Aalborg Øst (DK)

(72) Inventors: Bruno Graversen, Hadsund (DK); Lisha Shastri, Aalborg (DK); Lars Pilegaard Thomsen, Skørping (DK); Stephen Edward Rees, Gistrup (DK)

(73) Assignees: Roche Diagnostics A/S, Copenhagen V (DK); Aalborg Universitet, Aalborg Ost (DK)

( * ) Notice: Subject to any disclaimer, the term of this patent is extended or adjusted under 35 U.S.C. 154(b) by 880 days.

(21) Appl. No.: 17/600,620

(22) PCT Filed: Apr. 6, 2020

(86) PCT No.: PCT/EP2020/059791
§ 371 (c)(1),
(2) Date: Oct. 1, 2021

(87) PCT Pub. No.: WO2020/207979
PCT Pub. Date: Oct. 15, 2020

(65) Prior Publication Data
US 2022/0175283 A1    Jun. 9, 2022

(30) Foreign Application Priority Data

Apr. 11, 2019 (EP) .................................. 19168646

(51) Int. Cl.
*A61B 5/145* (2006.01)
*A61B 5/00* (2006.01)
*G16H 50/20* (2018.01)

(52) U.S. Cl.
CPC .......... *A61B 5/14542* (2013.01); *A61B 5/412* (2013.01); *G16H 50/20* (2018.01)

(58) Field of Classification Search
None
See application file for complete search history.

(56) References Cited

U.S. PATENT DOCUMENTS

| | | | |
|---|---|---|---|
| 2006/0105319 | A1 | 5/2006 | Rees et al. |
| 2013/0096404 | A1 | 4/2013 | Colman et al. |
| 2016/0317765 | A1 | 11/2016 | Rees et al. |
| 2017/0232214 | A1 | 8/2017 | Walsh |

FOREIGN PATENT DOCUMENTS

| | | |
|---|---|---|
| CN | 101954138 A | 1/2011 |
| CN | 107592818 A | 1/2018 |
| WO | 2004010861 A2 | 2/2004 |

(Continued)

OTHER PUBLICATIONS

International Search Report and Written Opinion mailed Jul. 2, 2020 in reference to co-pending European Patent Application No. PCT/EP2020/059791 filed Apr. 6, 2020.

(Continued)

*Primary Examiner* — Jay B Shah
(74) *Attorney, Agent, or Firm* — Thomas E. Lees, LLC (57) ABSTRACT

The present invention relates to a method for identification of tissue hypoxia from measurements of acid-base and oxygenation status from venous and/or arterial blood.

14 Claims, 9 Drawing Sheets

(56) References Cited

FOREIGN PATENT DOCUMENTS

WO      2004010861 A3      2/2004

OTHER PUBLICATIONS

Mallat et al., "Ratios of central venous-to-arterial carbon dioxide content or tension to arteriovenous oxygen content are better markers of global anaerobic metabolism than lactate in septic shock patients", Annals of Intensive Care, vol. 6, pp. 1-9, 2016.

Kabring, et al. "Journal of Clinical Monitoring and Computing 2015 end of year summary: respiration", J. Clin. Monit Comput, vol. 30, pp. 7-12, 2016.

Monnet, et al., "Lactate and Venoarterial Carbon Dioxide Difference/Arterial-Venous Oxygen Difference Ratio, but Not Central Venous Oxygen Saturation, Predict Increase in Oxygen Consumption in Fluid Responders", Critical Care Medicine, vol. 41, No. 6, pp. 1412-1420, Jun. 2013.

Rees, et al., "A method for calculation of arterial acid-base and blood gas status from measurements in the peripheral venous blood", Computer Methods and programs in Biomedicine, vol. 81, pp. 18-25, 2006.

Ospina-Tascón, et al., "Combination of arterial lactate levels and venous-arterial $CO_2$ to arterial-venous $O_2$ content difference ratio as markers of resuscitation in patients with septic shock", Intensive Care Med, vol. 41, pp. 796-805, 2015.

Ospina-Tascón, et al., "Understanding the venous-arterial $CO_2$ to arterial-venous $O_2$ content difference ration", Intensive Care Med, vol. 42, pp. 1801-1804, 2016.

Laura E. Morris, Daniela Fluck, Philip N. Ainslie and Ali M. McManus; Cerebrovascular and ventilatory responses to acute normobaric hypoxia in girls and women; Physiological Reports; 2017, vol. 5, Iss. 15; Jul. 8, 2017.

Chinese first Office action for Chinese Patent Application No. 202080027128.0; China National Intellectual Property Administration; Beijing, China; dated Sep. 15, 2023.

*Reference Arterial*

*Sample under review for tissue hypoxia*

[A]→[B] : Difference due to aerobic metabolism peripherally

[C]→[D] : Difference due to aerobic metabolism centrally

[D]→[B] : Difference due to non-aerobic metabolism

[C]→[B] : Total metabolism centrally (used in existing models)

Case B

Central Venous blood gas $pH_{a,c}$ = 7.223
$PCO_{2,a,c}$ = 9.99 kPa
$PO_{2,a,c}$ = 4.39 kPa
$SO_{2,a,c}$ = 45%
Hb = 11.0 mmol/L
FMetHb = 1.0%
FCOHb = 1.0%

BE = -1.6 mmol/L
BB = 48.9 mmol/L
$tCO_2$ = 27.0 mmol/L
$tO_2$ = 4.9 mmol/L
$HCO_{3,p}$ = 30.5 mmol/L
DPG = 6.2 mmol/L $$\text{RATIO} = \frac{(tCO_{2,cv} - tCO_{2,ABG})}{(tO_{2,ABG} - tO_{2,cv})} = \frac{(27.0 - 23.0)}{(9.9 - 4.9)} = 0.80$$

Arterial blood gas $pH_{a,c}$ = 7.275
$pCO_{2,a,c}$ = 7.90 kPa
$pO_{2,a,c}$ = 9.50 kPa
$SO_{2,a,c}$ = 90%
tHb = 11.0 mmol/L
FMetHb = 1.0%
FCOHb = 1.0%

BE = -1.6 mmol/L
BB = 56.2 mmol/L
$tCO_2$ = 23.0 mmol/L
$tO_2$ = 9.9 mmol/L
$HCO_{3,p}$ = 27.2 mmol/L
DPG = 6.2 mmol/L $$\text{RATIO} = \frac{(tCO_{2,cv} - tCO_{2,ABG})}{(tO_{2,ABG} - tO_{2,cv})} = \frac{(28.0 - 23.0)}{(9.9 - 4.9)} = 1.00$$

Central Venous blood gas + $tCO_2$ $pH_{a,c}$ = 7.196
$PCO_{2,a,c}$ = 10.92 kPa
$PO_{2,a,c}$ = 4.52 kPa
$SO_{2,a,c}$ = 45%
Hb = 11.0 mmol/L
FMetHb = 1.0%
FCOHb = 1.0%

BE = -1.60 mmol/L
BB = 56.2 mmol/L
$tCO_2$ = 28.0 mmol/L
$tO_2$ = 4.9 mmol/L
$HCO_{3,p}$ = 31.3 mmol/L
DPG = 6.2 mmol/L

Mass balance equations

1r) $tCO_2 = (CO_{2,p} + HCO_{3,p}^-) f_p + (CO_{2,e} + HCO_{3,e}^- + HbNHCOO^- + HbO_2NHCOO^-) f_e$

2r) $Atot_p = A_p^- + HA_p$

3ar) $Hb = (HbNH_3^+ + HbNH_2 + HbNHCOO^- + HbO_2NH_3^+ + HbO_2NH_2 + HbO_2NHCOO^-) f_e$

3br) $Hb = (Hb(RH)_b + Hb(R^-)_b + HbO_2(RH)_b + HbO_2(R^-)_b) f_e$

4ar) $SID = BB_p = HCO_{3,p}^- + A_p^-$

4br) $SID_e = BB_e = HCO_{3,e}^- + b\,Hb(R^-)_b + b\,HbO_2(R^-)_b + HbNH_2 + HbO_2NH_2 + 2\,HbNHCOO^- + 2\,HbO_2NHCOO^-$

4cr) $BB = BB_p f_p + BB_e f_e$

5r) $tO_2 = O_{2,p} f_p + (O_{2,e} + HbO_2NH_3^+ + HbO_2NH_2 + HbO_2NHCOO^-) f_e$

Mass action equations

6r) $pH_p = pKHCO_{3,p} + \log_{10}(HCO_{3,p}^- / CO_{2,p})$

7r) $pH_p = pKa_p + \log_{10}(A_p^- / HA_p)$

8r) $pH_e = pKHCO_{3,e} + \log_{10}(HCO_{3,e}^- / CO_{2,e})$

9r) $pH_e = pKzd + \log_{10}(HbNH_2 / HbNH_3^+)$

10r) $pH_e = pKzo + \log_{10}(HbO_2NH_2 / HbO_2NH_3^+)$

11r) $pH_e = pKcd + \log_{10}(HbNHCOO^- / (HbNH_2\,CO_{2,e}))$

12r) $pH_e = pKco + \log_{10}(HbO_2NHCOO^- / (HbO_2NH_2\,CO_{2,e}))$

13r) $pH_e = pKzd_R + \log_{10}(Hb(R^-)_b / Hb(RH)_b)$

14r) $pH_e = pKzo_R + \log_{10}(HbO_2(R^-)_b / HbO_2(RH)_b)$

15r) $SO_2 = ODC\,(PO_2, pH, PCO_2, DPG)$

16r) $SO_2 = (HbO_2NH_3^+ + HbO_2NH_2 + HbO_2NHCOO^-) / Hb_e$

17r) $SO_2 = (HbO_2(RH)_b + HbO_2(R^-)_b) / Hb_e$

Physico-chemical properties

18r) $O_{2,p} = \alpha_{O2}\,PO_2$

19r) $O_{2,e} = \alpha_{O2}\,PO_2$

20r) $CO_{2,p} = \alpha_p\,PCO_2$

21r) $CO_{2,e} = \alpha_e\,PCO_2$

22r) $f_p = 1 - f_e$

23r) $f_e = Hb/21$

24r) $pH_e = 7.19 + 0.77\,(pH_p - 7.4) + 0.031\,\delta sO_2$

Siggaard-Andersen (BE and anion gap)

25r) $BE = BB - nBB$

26ar) $A_p^- - X^- = Na_p^+ + K_p^+ + 2Ca_p^{++} + 2Mg_p^{++} - Cl_p^- - HCO_{3,p}^-$

Stewart (SID)

26br) $SID = BB_p = Na_p^+ + K_p^+ + 2Ca_p^{++} + 2Mg_p^{++} - Cl_p^- + X$

Fig. 6 (continued)

IDENTIFICATION AND QUANTIFICATION OF THE DEGREE OF TISSUE HYPOXIA

FIELD OF THE INVENTION

The present invention relates to a computer-implemented method for identification of the degree of tissue hypoxia. The method analyses the difference between arterial and venous oxygenation and acid base status, and isolates the component of this difference due to tissue hypoxia. The invention also relates to a corresponding data processing system, and a corresponding computer program product for execution on a computer.

BACKGROUND OF THE INVENTION

Patients with critical illness often present with circulatory or metabolic disturbances resulting in tissue hypoxia. This in turn can result in the production of strong acids in the tissues, and the transport of this strong acid into the blood. In addition, this can result in buffering of these strong acids in the tissues, which elevates the partial pressure of carbon dioxide ($PCO_2$) and leads to the transport of $CO_2$ from tissues to blood in excess of that due to normal aerobic metabolism. Addition of strong acid and excessive amounts of $CO_2$ into blood passing through the tissues, results in the venous blood having an oxygen ($O_2$) and acid-base status, quite different from the situation where exchange of $O_2$ and carbon dioxide ($CO_2$) between tissues and blood is due solely to aerobic metabolism. For aerobic metabolism, the ratio of $CO_2$ addition to $O_2$ removal, known as the respiratory quotient (RQ) varies between 0.7-1.0, meaning that there are roughly equivalent amounts of $O_2$ removed and $CO_2$ added as blood passes the tissues. In the situation of acid transport from tissues to blood or excessive $CO_2$ transport, the apparent RQ measured across the tissues is increased substantially, with much greater quantities of $CO_2$ added to either the blood, or present due to acid buffering, in relation to the oxygen removed.

To identify this situation, and as such to describe signs of tissue hypoxia, previous authors have applied ratios of the venous to arterial values of $CO_2$ to $O_2$ content. These include ratios using $PCO_2$, e.g. $\Delta PCO_2(v-a)/\Delta tO_2(a-v)$, or ratios using the content of CO2 and O2 in the venous and arterial blood, e.g. $\Delta tCO_2(v-a)/\Delta tO_2(a-v)$ (1-4 cited below). However, these methods for describing signs of tissue hypoxia have various limitations, for example being influenced from other medical conditions.

OBJECT OF THE INVENTION

It is an object of the present invention to provide an alternative to the prior art. In particular, it may be seen as an object of the present invention to provide a method that solves the above mentioned problems of the prior art with unknown or uncertain influence on measures for tissue hypoxia.

SUMMARY OF THE INVENTION

The above mentioned ratios using $PCO_2$, e.g. $\Delta PCO_2(v-a)/\Delta tO_2(a-v)$, or ratios using the content of $CO_2$ and $O_2$ in the venous and arterial blood are not optimal as the present inventors have realised.

These ratios can however be flawed in at least two ways.

Figure 4:
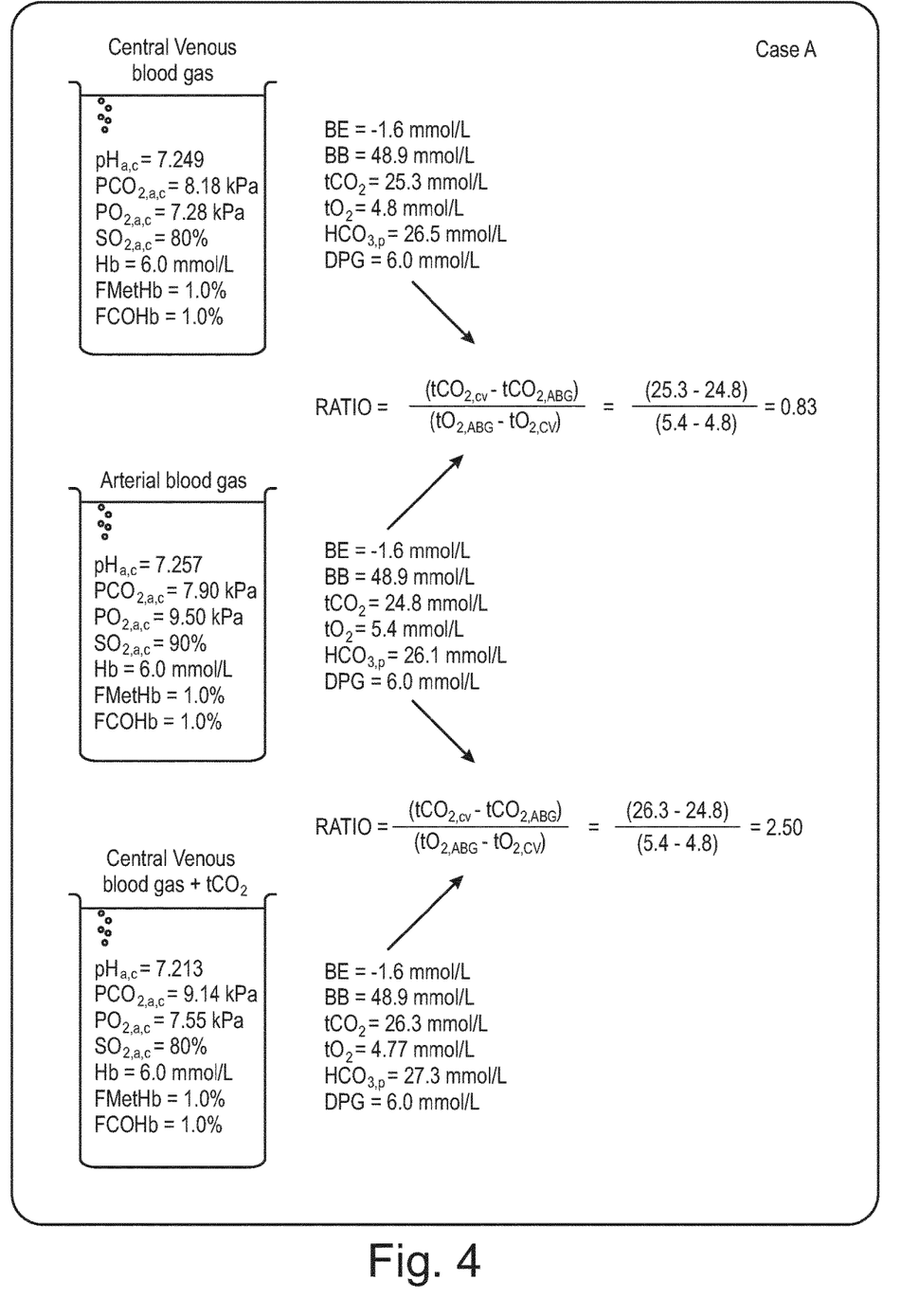
FIG. 4 illustrates the situation where the method may be of potential advantage when separating the effects of tissue hypoxia from the level of aerobic metabolism.

The first is that they are sensitive to the level of aerobic metabolism. A low level of aerobic metabolism results in only a small drop in oxygen over the tissues, i.e. the $\Delta tO_2(a-v)$ term described above. As the value of $\Delta tO_2(a-v)$ is on the denominator of the ratio, then for small values of $\Delta tO_2(a-v)$ the ratio becomes sensitive to even small changes in $CO_2$ across the tissues and blood gas measurement tolerances. This will be shown in more detail below, c.f. FIG. 4 and corresponding description.

Secondly, changes in $CO_2$ across the tissues might be modified by transient changes in ventilation. An increase in ventilation will reduce arterial $PCO_2$ levels transiently. This will generate an increased gradient in $PCO_2$ between tissues and blood not caused by aerobic metabolism or tissue hypoxia, resulting in high values of these indices even where tissue hypoxia is not present.

The two limitations can also act together, meaning that increased ventilation in subjects with low baseline metabolism can result in extremely elevated values of these indices in complete absence of tissue hypoxia.

Hence, an improved method to differentiate the components of arterial to venous differences at least to due to a) aerobic metabolism, b) transient changes in ventilation and c) tissue hypoxia would be advantageous in determining the degree of tissue hypoxia.

Thus, the above-described object and several other objects are intended to be obtained in a first aspect of the invention by providing a computer-implemented method for determining the degree of tissue hypoxia of a subject, the method comprising
 a) measuring and/or estimating values of blood acid-base status in a blood sample, the blood sample being obtained from venous blood of the subject,
 b) providing values of measured and/or estimated arterial oxygenation from said subject,
 c) converting the venous blood values by applying a venous-to-arterial conversion model for deriving blood acid-base status and oxygenation status into first estimated arterial blood values,
 d) providing a second reference acid-base status and oxygenation values of arterial blood from the said subject,
 e) implementing a tissue hypoxia model using a measure of the total buffer base concentration and/or a measure of the total carbon dioxide content in the blood, said model having as an input, at least, said first estimated arterial blood values, and said second reference values of arterial blood,
 f) the tissue hypoxia model calculating:
  a. a first measure indicative of the change in the total buffer base concentration between the said first estimated arterial blood values and said second reference values of arterial blood, and/or
  b. a second measure indicative of the change in the total carbon dioxide content between the said first estimated arterial blood values and said second reference values of arterial blood, and
 g) the tissue hypoxia model being arranged to output a measure indicative of the degree of tissue hypoxia in the subject using said first and/or second measure.

The present invention is particularly—but not exclusively—advantageous, in that measurement and analysis provides values of variables describing the presence of or degree of tissue hypoxia, which—to the best knowledge of the inventors—was previously not available in this field.

In the broadest sense, the invention may be advantageously applied to assist in evaluating whether the venous value taken in an unspecific venous site have been modified by the addition of CO2 or strong acid into the blood as it passes through the tissues, in particular in relation to a venous values from a specific site where anaerobic metabolism was not present.

In this context, the term "unspecific" venous blood is used to denote a venous sample in which there is no understanding as to whether the sample has been modified by mechanisms other than aerobic metabolism during its transit through the tissues. In addition, in this context, the term "specific" venous blood is used to denote a venous sample drawn from a warm, well-perfused extremity, as identified from routine clinical practice, and as such is unlikely to have been modified by anaerobic metabolism its transit through the tissues The presence of modifications can be described in a two-result fashion, i.e. 'present' or 'not present', but the invention may of course also output a more nuanced level of this risk, both qualitatively and in a quantified manner. Thus, in a quantitative manner it could be a number, such as the $CO_2$ and/or strong acid necessary to be added to the second reference arterial blood so as to account for the difference between the unspecific venous sample and second reference arterial value. A specific venous sample can be used as a surrogate for the reference arterial value when drawn from a warm, well-perfused site, as identified from routine clinical practice, and as such is unlikely to have been modified by anaerobic metabolism its transit through the tissues. If provided in a qualitative manner it could be e.g. a three-level regime, e.g. 'present', 'to a small extent' and 'to a large extent', or a four-level risk regime, and so forth.

The degree to which venous blood has been modified by tissue hypoxia may be output and indicated to a user, e.g. a clinician, in any kind of suitable graphical user interface (GUI), by sounds/alarms, or other human-machine interfaces, and/or stored for later use, e.g. for analysis and assessment by a clinician.

Thus, the method of the invention provides an indication as to the presence of and/or degree of ongoing tissue hypoxia, the said indications intended for assisting or guiding e.g., the clinician in making decisions of a therapeutic and/or diagnostic character. Thus, the present invention is not designed to make an actual diagnosis, but merely to provide intelligent information, that may assist them in making the intellectual exercise of evaluating the quality of the arterial acid-base measurements. The diagnosis may then be accompanied by an action of therapeutic character, if needed.

In one embodiment, wherein the output measure in g) may comprise the first measure and/or the second measure, or any combinations thereof. Thus, it is contemplated that once the general principle and teaching of the invention is understood by the skilled person, the first and the second measures may form valuable measures for direct clinical value to describe the degree of tissue hypoxia not hitherto possible.

Advantageously, the tissue hypoxia model may be further performing a minimization process of the first measure and/or the second measure. The skilled person will understand that mathematically the process of finding an optimum value of the first and/or second measure could be performed by alternative mathematical methods, such as a reformulation to a maximization process, etc. Beneficially, the minimization process of the measure may be performed by an iteration process using said measures, especially considering the normally complex mathematical formulas expressing the tissue hypoxia model.

Furthermore, the minimization process of the first measure and/or the second measure may be performed by an iteration process, preferably using a combined error function of the first and the second measures or any measures of acid-base included in these measures, such as the pH, $PCO_2$, etc., to quickly and/or efficiently obtain a satisfactory result.

In embodiment, the said second reference arterial blood values from said subject may be derived from a venous blood sample drawn from a warm, well-perfused extremity like a finger, ear lobe, or similar body sites as the skilled person will readily understand. Additionally, such second reference arterial blood values from said subject may be derived by:
  measuring and/or estimating values of blood acid-base status in a blood sample, said blood sample being drawn from venous blood of the subject,
  providing values of measured and/or estimated arterial oxygenation from said subject, and
  converting the venous blood values by applying a venous-to-arterial conversion model for deriving blood acid-base status and oxygenation status into second estimated arterial blood values, i.e. in a way similar to the way the said first estimated arterial blood values are obtained. Thus, the venous-to-arterial conversion model could be the same, but it could also be two different models.

In another embodiment, said second reference arterial blood values from said subject may be derived from an arterial blood sample in stable ventilator conditions, such as in mechanically ventilated patients without spontaneous breathing activity in an intensive care unit.

In another embodiment, said second reference arterial blood values from said subject may be derived from an arterial blood sample where ventilation could be unstable, i.e. there could be a transient change, increase or decrease, in the ventilation of the subject or patient. The present invention enables a measure of this situation, which was not possible hitherto.

In an advantageous embodiment, the tissue hypoxia model may further receive third blood acid-base status and oxygenation reference values of arterial blood values from said subject. Thus, the tissue hypoxia model may receive at least three different blood samples for comparison, namely arterial, peripheral venous from a warm, well-perfused extremity and a third central venous sample. These can then be used to apportion the effects of transient changes in ventilation from the effects of tissue hypoxia, knowing that they can both be simultaneously occurring, which may be advantageous in some clinical situations.

In a second aspect, the invention relates to a data processing system for determining the degree of tissue hypoxia of a subject, said data processing system comprising:
  a) means for measuring and/or estimating values of blood acid-base status in a blood sample, the blood sample being obtained from venous blood of the subject,
  b) means for receiving, or providing, values of measured and/or estimated arterial oxygenation from said subject,
  c) means for converting the venous blood values by applying a venous-to-arterial conversion model for deriving blood acid-base status and oxygenation status into first estimated arterial blood values,
  d) means for receiving, or providing, second reference acid-base status and oxygenation values of arterial blood from the said subject,
  e) means for implementing a tissue hypoxia model using a measure of the total buffer base concentration and/or a measure of the total carbon dioxide content in the arterial blood, said model having as input, at least, said first estimated arterial blood values, and said second reference values of arterial blood, f) the tissue hypoxia model calculating:
   a. a first measure indicative of the change in the total buffer base concentration between the said first estimated arterial blood values and said second reference values of arterial blood, and/or
   b. a second measure indicative of the change in the total carbon dioxide content between the said first estimated arterial blood values and said second reference values of arterial blood, and
g) the tissue hypoxia model being arranged to output a measure indicative of the degree of tissue hypoxia of the subject using said first and/or second measure.

In a third aspect, the invention relates to a computer program product being adapted to enable a computer system comprising of at least one computer having data storage means in connection therewith to control a data processing system according to the second aspect of the invention.

This aspect of the invention is particularly, but not exclusively, advantageous in that the present invention may be accomplished by a computer program product enabling a computer system to carry out the operations of the data processing system of the second aspect of the invention when downloaded or uploaded into the computer system. Such a computer program product may be provided on any kind of computer readable medium, or through a network.

In a fourth aspect, the invention relates to a method of determining a degree of tissue hypoxia of a subject and treating a determined tissue hypoxia in said subject, the method comprising
   a) measuring and/or estimating values of blood acid-base status in a blood sample (VBG), the blood sample being obtained from venous blood of the subject,
   b) providing values of measured and/or estimated arterial oxygenation ($SO_{2AM}$, $SO_{2AE}$, $SpO_2$) from said subject,
   c) converting the venous blood values by applying a venous-to-arterial conversion model for deriving blood acid-base status and oxygenation status into first estimated arterial blood values ($1\_ABG_C$),
   d) providing second reference acid-base status and oxygenation values of arterial blood (2_ABG) from the said subject,
   e) implementing a tissue hypoxia model using a measure of the total buffer base concentration (BB) and/or a measure of the total carbon dioxide content ($tCO_2$) in the arterial blood, said model having as input, at least, said first estimated arterial blood values ($1\_ABG_C$), and said second reference values of arterial blood (2_ABG),
   f) the tissue hypoxia model calculating:
      a. a first measure indicative of the change in the total buffer base concentration ($\Delta BB_T$) between the said first estimated arterial blood values ($1\_ABG_C$) and said second reference values of arterial blood (2_ABG), and/or
      b. a second measure indicative of the change in the total carbon dioxide content ($\Delta tCO_{2,T}$) between the said first estimated arterial blood values ($1\_ABG_C$) and said second reference values of arterial blood (2_ABG),
   g) the tissue hypoxia model being arranged to output a measure indicative of the degree of tissue hypoxia of the subject using said first and/or second measure, and
   h) treating the subject according to the measure indicative of the degree of tissue hypoxia, such as by increasing a flow of oxygen to said subject or by increasing a ventilation rate to said subject.

This aspect of the invention is particularly, but not exclusively, advantageous in that the present invention may provide automated treatment to a subject suffering from tissue hypoxia, so as to aid an operator or physician in treating said subject.

In a fifth aspect, the invention relates to a device for determining the degree of tissue hypoxia of a subject, said device comprising:
   a) means for measuring and/or estimating values of blood acid-base status in a blood sample (VBG), the blood sample being obtained from venous blood of the subject,
   b) means for receiving, or providing, values of measured and/or estimated arterial oxygenation ($SO_{2AM}$, $SO_{2AE}$, $SpO_2$) from said subject,
   c) means for converting the venous blood values by applying a venous-to-arterial conversion model for deriving blood acid-base status and oxygenation status into first estimated arterial blood values ($1\_ABG_C$),
   d) means for receiving, or providing, second reference acid-base status and oxygenation values of arterial blood (2_ABG) from the said subject,
   e) means for implementing a tissue hypoxia model using a measure of the total buffer base concentration (BB) and/or a measure of the total carbon dioxide content ($tCO_2$) in the arterial blood, said model having as input, at least, said first estimated arterial blood values ($1\_ABG_C$), and said second reference values of arterial blood (2_ABG),
   f) the tissue hypoxia model calculating:
      a. a first measure indicative of the change in the total buffer base concentration ($\Delta BB_T$) between the said first estimated arterial blood values ($1\_ABG_C$) and said second reference values of arterial blood (2_ABG), and/or
      b. a second measure indicative of the change in the total carbon dioxide content ($\Delta tCO_{2,T}$) between the said first estimated arterial blood values ($1\_ABG_C$) and said second reference values of arterial blood (2_ABG), and
   the tissue hypoxia model being arranged to output a measure indicative of the degree of tissue hypoxia of the subject using said first and/or second measure to a display of the device.

In an advantageous embodiment of the invention, the device further comprises
   g) ventilation means for providing ventilation and supplemental oxygen to a subject, and
   h) controlling means for controlling a ventilation rate and/or oxygen flow from said ventilator to said subject.

This aspect of the invention is particularly, but not exclusively, advantageous in that the present invention provides a device for automatically determining tissue hypoxia of a subject and automatically provides a suitable treatment, such as an increased or decreased ventilation rate of a ventilator and or an increased or decreased oxygen flow to said subject, so as to improve the state of the subjects tissue hypoxia without an operator present.

In a sixth aspect, the invention relates to the use the device according to the fifth aspect of the invention, for treating tissue hypoxia, in which the device adjusts the ventilation rate and/or oxygen flow of said associated ventilator based on the measurements output by the tissue hypoxia model to the device.

The individual aspects of the present invention may each be combined with any of the other aspects. These and other aspects of the invention will be apparent from the following description with reference to the described embodiments.

BRIEF DESCRIPTION OF THE FIGURES

The invention will now be described in more detail with regard to the accompanying figures. The figures show one way of implementing the present invention and is not to be construed as being limiting to other possible embodiments falling within the scope of the attached claim set.

FIGS. 4 and 5 illustrate situations where the method may be of potential advantage in relation to state of the art.

DETAILED DESCRIPTION OF AN EMBODIMENT

This invention is a method and a corresponding computer system for identifying the degree to which tissue hypoxia has modified measures of arterial acid-base chemistry. An element of the invention is a comparison of calculated and measured values of acid-base chemistry.

Figure 1:
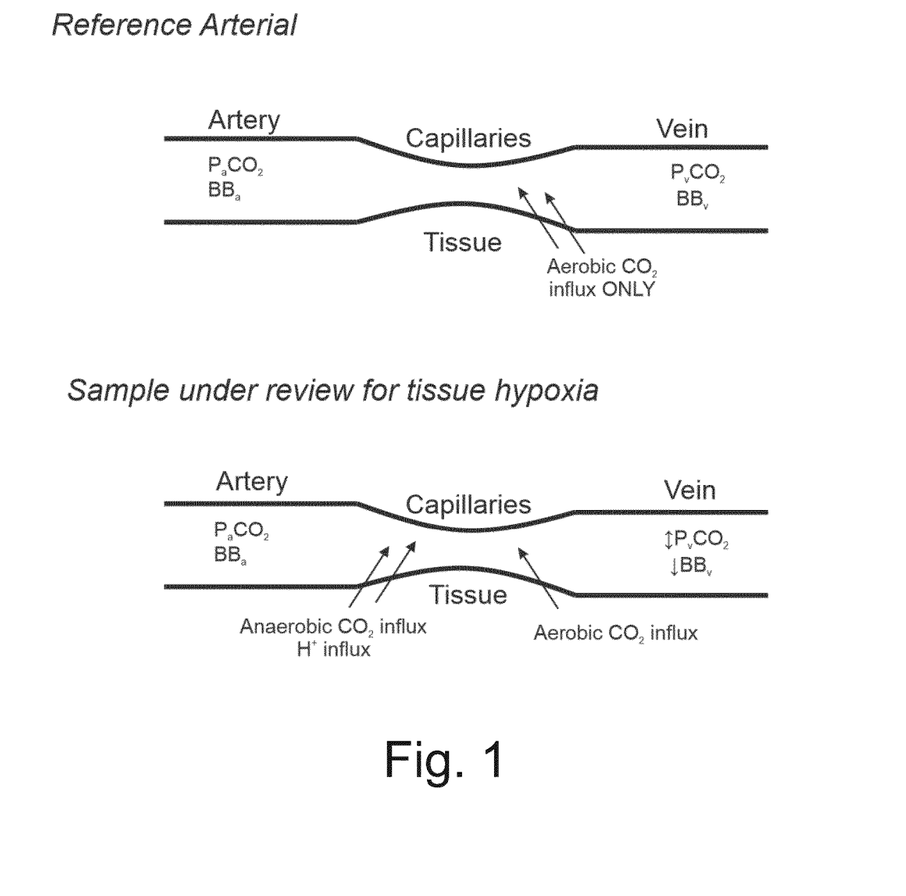
FIG. 1 depicts the effects of tissue hypoxia on blood $CO_2$ and BB at the tissue site.
Figure 2:
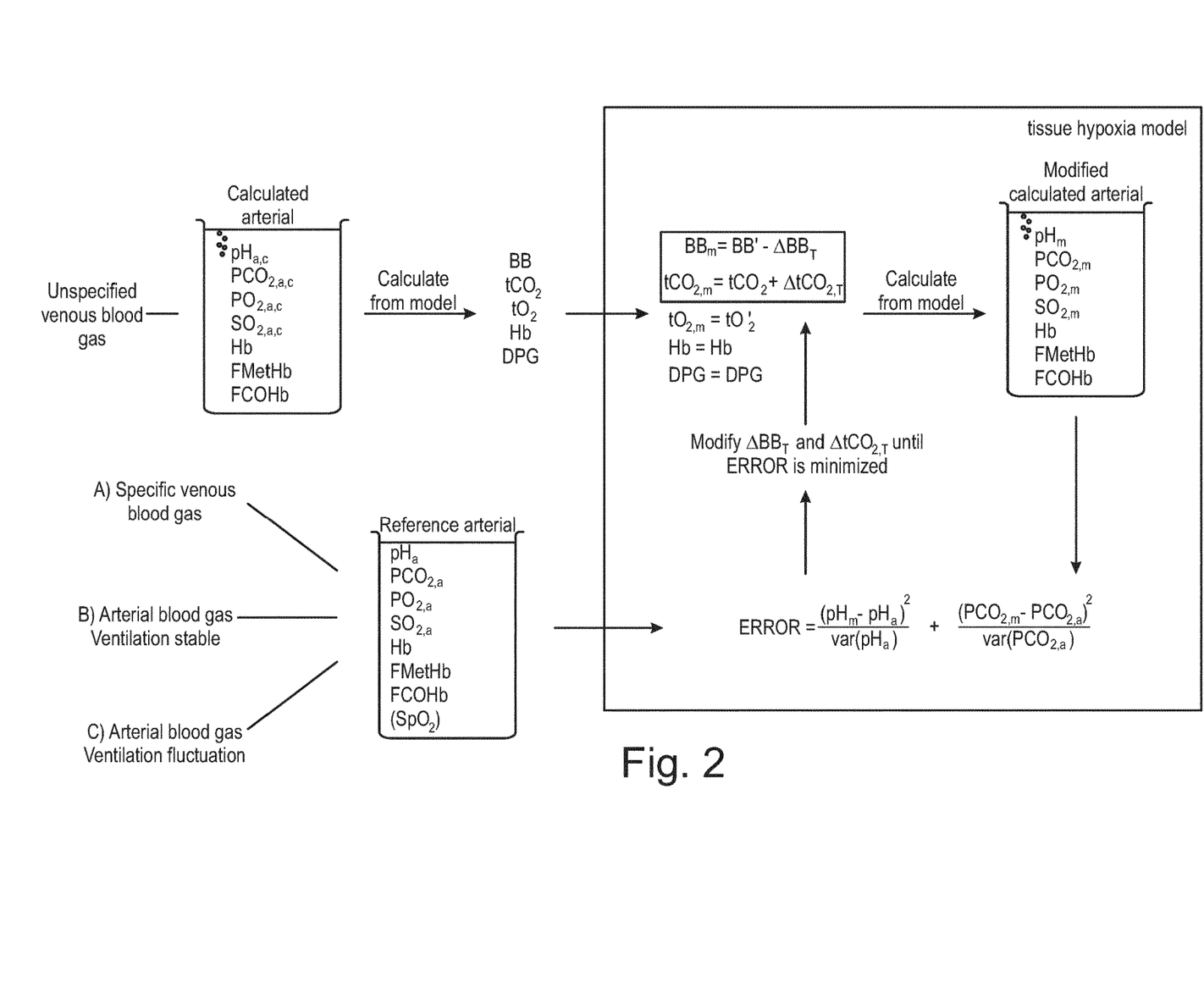
FIG. 2 is an example of the method, including, but not limited to, the preferential embodiment for the second input, i.e. calculation of reference arterial values from a specific venous, in this case a peripheral venous expected to have little or no tissue hypoxia.

FIG. 2 is a schematic drawing of the method of the invention. The method, illustrated on the figure, includes input from a previous method using specified and unspecified venous blood samples to obtain "calculated arterial" values of acid-base and oxygenation status (cf. WO 2004/010861 (to OBI Medical Aps, Denmark) (5) as defined in steps a, b, and c of the first aspect of the invention. In this context, the term "unspecific" venous blood is used to denote a venous sample in which there is no understanding as to whether the sample has been modified by mechanisms other than aerobic metabolism during its transit through the tissues. As such, it is not understood whether this sample has been modified by either tissue hypoxia, or by any other mechanism, as described in the background to this method. This input is, in effect, arterial values calculated as if aerobic metabolism is the only mechanism for modification of oxygenation and acid-base across the tissue, with these arterial values called "calculated arterial" on the figure.

The second input is that describing "reference arterial" values. The source of these reference arterial values can be of three types, and therefore represents three embodiments of this method. Preferentially, the source includes input from the previous method calculating arterial acid-base and oxygenation status from a specific venous blood sample. This source is labelled A in the figure, and in this context, the term "specific" venous blood is used to denote a venous sample drawn from a warm, well-perfused extremity, as identified from routine clinical practice, and as such is unlikely to have been modified by anaerobic metabolism its transit through the tissues. This input is, in effect, arterial values calculated as if aerobic metabolism is the only mechanism but in a situation where tissue hypoxia is unlikely.

Generally, the calculated arterial values are defined as an embodiment of the first estimated arterial blood values, and the measured arterial values are defined as an embodiment of the second reference acid-base status and oxygenation values of arterial blood in the first, second and third aspect of the present invention Alternatively, the source can be measured from an arterial sample in stable ventilator conditions, labelled B on the figure, such as in mechanically ventilated patients without spontaneous breathing activity.

Another alternative could be an arterial sample where ventilation might have been unstable, labelled C on the figure, where it is not understood whether this sample has been modified by a transient change in ventilation. For any of these three sources this input is called "reference arterial" on the figure.

Using the calculated arterial and reference arterial as input, enables calculation of the differences between these two. Calculated arterial values are first transformed to concentrations using standard mathematical models of acid-base chemistry as illustrated in FIG. 7, so as to calculate the total buffer base concentration (BB) and the total $CO_2$ ($tCO_2$) in the calculated arterial blood.

Differences between calculated arterial values and reference arterial values can then be calculated as the $CO_2$ content ($\Delta tCO_{2,T}$) and/or buffer base ($\Delta BB_T$) required to be added to or removed from the blood such that modified calculated arterial values of pH and PCO2 minimize the error function shown. As an alternative to buffer base ($\Delta BB_T$), base excess ($ABE_T$) in combination with $CO_2$ content ($\Delta tCO_{2,T}$) can be used. Here the subscripts 'T' are used to denote changes due to the effects of tissue hypoxia.

As illustrated in the figure, the values of $\Delta tCO_{2,T}$ and $\Delta BB_T$ can be calculated by iteratively searching through possible values, until values of $\Delta tCO_{2,T}$ and $\Delta BB_T$ are found which minimize the error function. One potential error function is illustrated in the figure. Calculated values of $\Delta tCO_{2,T}$ or $\Delta BB_T$ can be understood differently depending upon the difference sources of input 2: A, B or C on the figure.

For source A, i.e. reference arterial values from a specific venous sample, the differences between reference arterial and calculated arterial are solely due to anaerobic metabolism. Values of $\Delta tCO_{2,T}$ and $\Delta BB_T$, therefore describe the $CO_2$ and strong acid added due to tissue hypoxia.

For source B, i.e. reference arterial values from measured arterial at stable ventilation, the differences between reference arterial and calculated arterial are solely due to anaerobic metabolism. Values of $\Delta tCO_{2,T}$ and $\Delta BB_T$, therefore describe the $CO_2$ and strong acid added due to tissue hypoxia.

For source C, i.e. reference arterial values from measured arterial at potentially unstable ventilation, the differences between reference arterial and calculated arterial can be due to either ventilation disturbance or anaerobic metabolism. Values of $\Delta tCO_{2,T}$ therefore describes the net $CO_2$ added due to both these effects, with an addition of strong acid, $\Delta BB_T$, being strongly suggestive of tissue hypoxia.

Figure 3:
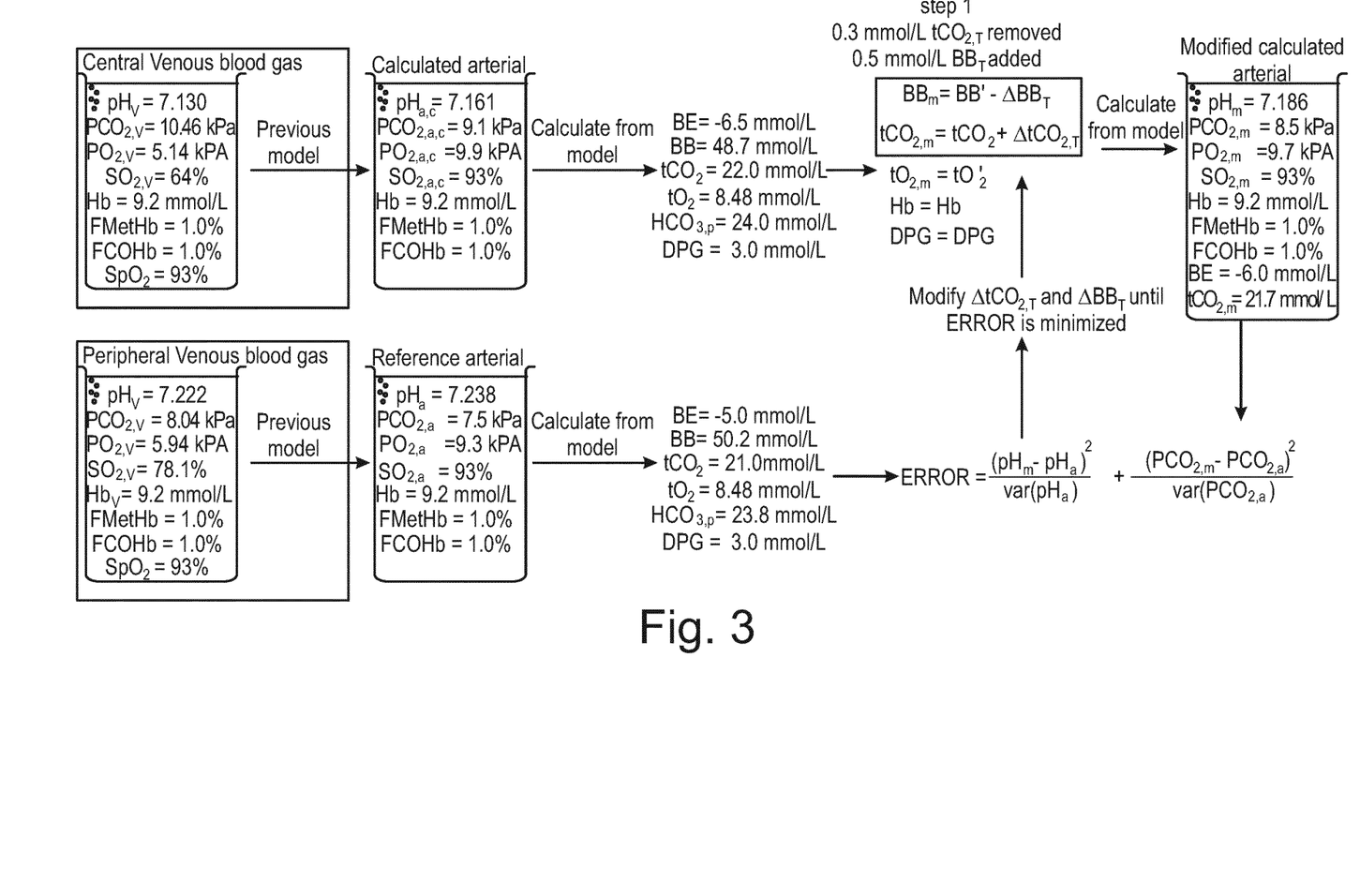
FIG. 3 outlines a simulated patient case illustrating the calculation of level of tissue hypoxia

FIG. 3 is an example of the method, including the preferential embodiment for the second input, i.e. calculation of reference arterial values from a specific venous sample, in this case a peripheral venous sample expected to have little or no tissue hypoxia. In addition to this example, the unspecific venous is a central venous sample. Calculated arterial values of acid-base and oxygen status are modified by removal of $CO_2$ ($\Delta tCO_{2,T}$) and addition of buffer base ($\Delta BB_T$) so as to account for anaerobic metabolism. Values of $\Delta tCO_{2,T}$ and $\Delta BB_T$ are selected so as to minimize the shown error function, such that the modified values of calculated arterial are as close to the reference arterial values as possible. The example illustrates a possible first step in minimization of the error function and hence estimation of $\Delta tCO_{2,T}$ and $\Delta BB_T$. It can be concluded that these additions cannot be accounted for by aerobic metabolism or transient ventilation, and as such are indicative of tissue hypoxia.

Figure 3B:
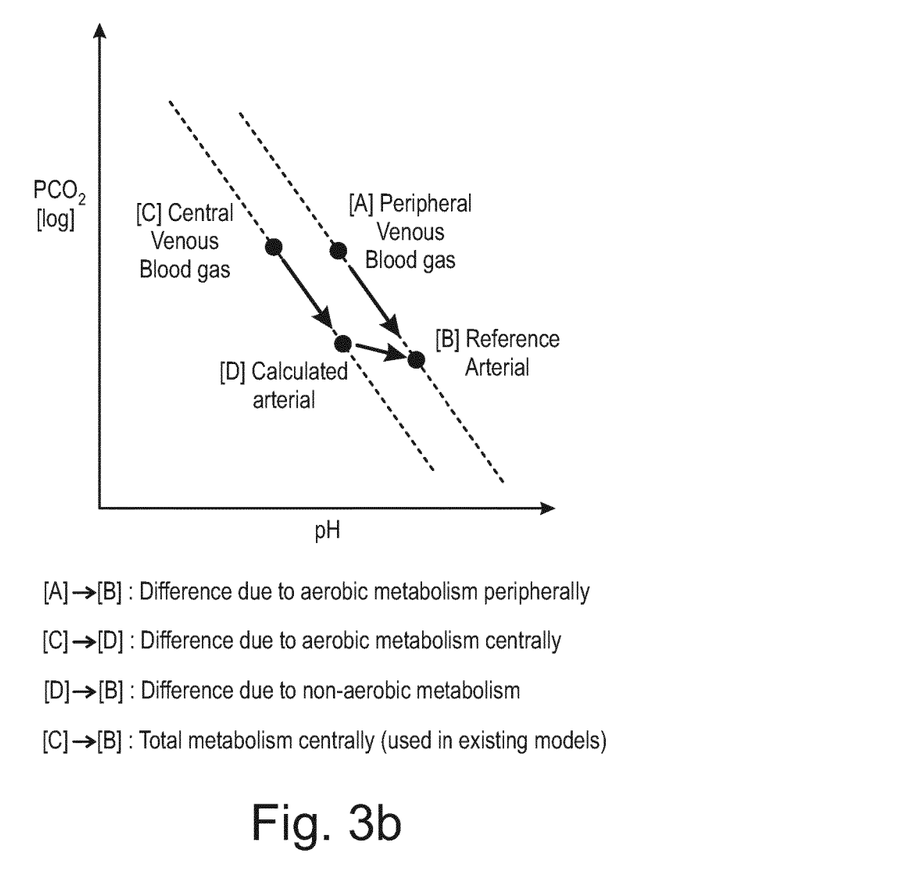
FIG. 3b shows a sample pair presented on their individual buffer lines.

A common way of describing $CO_2$ and BB modification is through buffer lines illustrating the relationship between pH and $PCO_2$ in the blood. Two such buffer lines are illustrated in FIG. 3b, illustrating this case. The specific venous blood, in this case peripheral venous (shown as dot [A]), has higher $PCO_2$ and lower pH than the reference arterial (dot [B]) but lies on the same buffer line. If all transport of $CO_2$ over the tissues were due to aerobic metabolism, as can be expected in a peripheral venous sample taken from a warm well perfused site, then the reference arterial calculated from this venous represents the true arterial undisturbed by changes in ventilation. The unspecific venous blood, in this case central venous (shown as dot [C]), has higher $PCO_2$ and lower pH than the calculated arterial (dot [D]) but lies on the same buffer line. The difference between the calculated and reference arterial represents the need for change in both $CO_2$ and BB so as to move along and between buffer lines, with these changes due to tissue hypoxia.

FIG. 4 illustrates a situation where the method may be advantageous in relation to existing methods. In particular, it illustrates an example showing the sensitivity of current methods to the level of aerobic metabolism. Two examples are shown, the first with reduced aerobic metabolism (Case A—left), and increased aerobic metabolism (Case B—right). Standard ratios used in current clinical practice to identify tissue hypoxia are used to describe both these situations; the situation for aerobic metabolism alone is illustrated in the top half of the figure for both these cases. The situation for the presence of tissue hypoxia is illustrated in the bottom half of both figures with the addition of 1 mmol/l $\Delta tCO_{2,T}$ to the venous sample. In doing so, it is shown how the same 1 mmol/l $\Delta tCO_{2,T}$ addition to two different cases with different aerobic conditions can have a very different clinical interpretation. In doing so it is shown that the calculation of $\Delta tCO_{2,T}$ proposed by the method in this patent may be advantageous in relation to current clinical indices. The details are as follows:

Case A, on the left of the figure, illustrates a simulated situation of reduced aerobic metabolism. The reference arterial blood gas values, shown in the middle of the figure on the left hand side include an oxygen saturation of 90% and a relatively low value of blood haemoglobin concentration (6 mmol/l). This means that the total oxygen concentration of arterial blood is similarly low, i.e. $taO_2$=5.4 mmol/l. In addition, the level of oxygenation in the unspecific venous values, in this case central venous, remain high, at a saturation of 80% such that central venous oxygen concentration ($tcvO_2$) is 4.8 mmol/l. This means that little oxygen has been utilised in the tissue, and the $\Delta tO_2$ is small ($\Delta tO_2$=5.4−4.8=0.6 mmol/l).

In contrast, Case B on the right of the figure illustrates a situation of elevated aerobic metabolism. Arterial oxygen saturation is 90% and the value of haemoglobin is high (11 mmol/l). This means that the total oxygen concentration of arterial blood is elevated $taO_2$=9.9 mmol/l. In addition, venous values of oxygenation are low at 45% such that central venous oxygen concentration is 4.95 mmol/l. As such, substantial oxygen is utilised in the tissue, and the $\Delta tO_2$ is large $\Delta tO_2$=9.9−4.95=4.95 mmol/l.

Applying a clinical ratio seen as current best practice to these two situations provides a similar clinical interpretation in the case of aerobic metabolism alone. The value of this ratio, labelled RATIO on the figure and described as the ratio of $\Delta tCO_2(v-a)/\Delta tO_2(a-v)$, is shown for the case of aerobic metabolism alone, with the low aerobic metabolism case (case A) and the high aerobic metabolism case (case B) having a value of 0.80 and 0.83, respectively. These values are below the value of 1.02 used as a cut-off to identify sepsis or tissue hypoxia (1).

At the bottom of the figure, the same indices are calculated following a simulated addition of $\Delta tCO_{2,T}$=1 mmol/l to the central venous values, so as to approximate the effects of $CO_2$ addition due to tissue hypoxia. The resulting central venous values for case A and case B are shown. Applying the same clinical ratio to compare arterial and central venous samples after addition of $\Delta tCO_{2,T}$=1 mmol/l to both central venous samples provides a dramatically different clinical interpretation. The low aerobic metabolism case (A) has a value of the ratio of 2.50; and the high aerobic metabolism case having a value of 1.00. In this case only the low aerobic metabolism case (case A) would result in a ratio above the value of 1.02 used to identify sepsis or tissue hypoxia (1), despite the same $CO_2$ concentration change due to tissue hypoxia.

This clearly shows that the identification of $\Delta tCO_{2,T}$, possible from the method presented here, is not equivalent to current methods and may be advantageous in identifying tissue hypoxia separate from the underlying aerobic metabolism.

Figure 5:
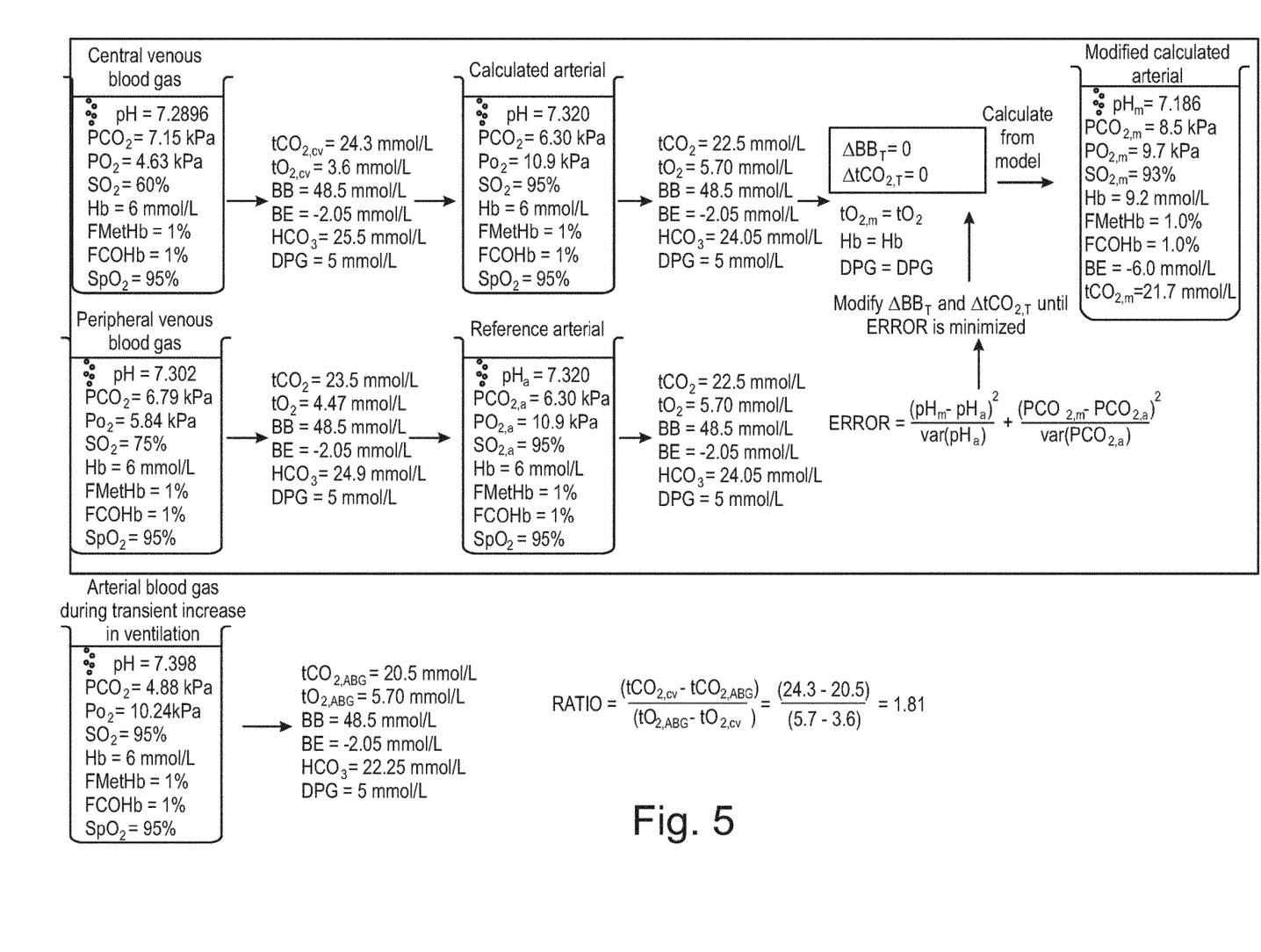
FIG. 5 illustrates the situation where the method may be of potential advantage when separating the effects of tissue hypoxia from transient changes in ventilation.

FIG. 5 illustrates a second situation where the method may be advantageous in relation to existing methods. In particular, it illustrates a simulated situation where a ventilation disturbance can lead to a $\Delta tCO_2(v-a)/\Delta tO_2(a-v)$ ratio which would classify the patient as having tissue hypoxia or sepsis despite this clearly not being the case.

Illustrated at the top of the figure, and surrounded by a box, is an example of the preferential embodiment of the method with the unspecific venous measurements as a central venous and the specific venous measurement as a peripheral venous. The calculated values of $\Delta CO_{2,T}$ and $\Delta BB_T$ in this case are both zero, indicating no tissue hypoxia.

Also included on the figure are the values of a simultaneous arterial sample in the presence of a transient increase in ventilation. As arterial acid-base values respond rapidly to changes in ventilation, $CO_2$ values are substantially lower than both the reference and calculated arterial values. However, current indices classifying sepsis and tissue hypoxia based on arterial and venous difference ratios do not make the distinction between differences due to increases in ventilation and tissue hypoxia and could therefore lead to erroneous conclusions. This is illustrated by calculating the value of the $\Delta tCO_2(v-a)/\Delta tO_2(a-v)$ ratio for the relationship between arterial and central venous blood, and this is shown at the bottom of the figure. The value for this ratio in this instance is 1.81, substantially higher that the 1.02 threshold used to identify sepsis or tissue hypoxia ((ref 1), potentially resulting in information indicating tissue hypoxia in a situation where a transient increase in ventilation was the only cause.

This example clearly indicates the advantageous nature of the method presented here in relation to current practice in separating the effects of transient increase in ventilation and tissue hypoxia.

Figure 6:
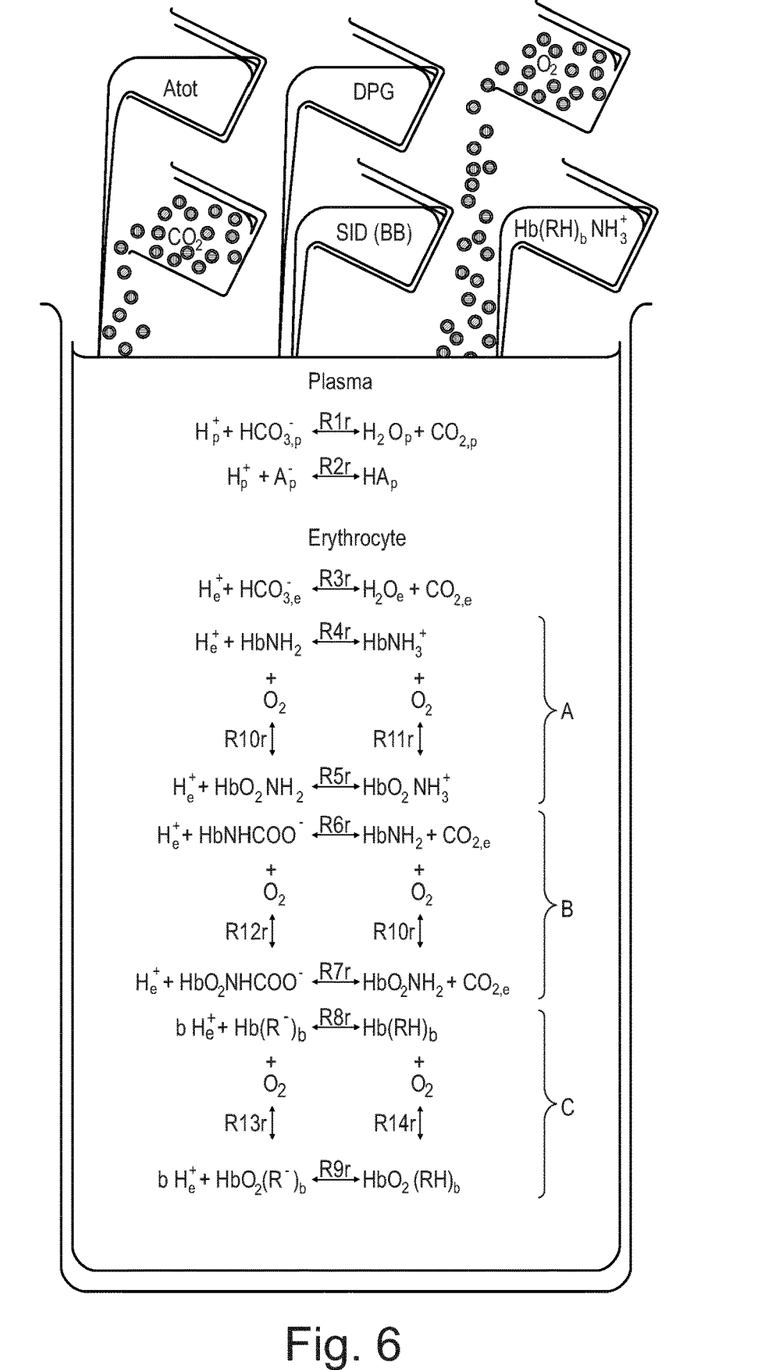
FIG. 6 illustrates an example of a mathematical model of acid-base chemistry, modified from a previous publication (5).

FIG. 6 illustrates a mathematical model of the acid-base chemistry of blood, published previously (5). This model, or similar, is required to perform simulations of modifications of the acid-base chemistry in the blood as illustrated where it states "Calculate from model" in FIGS. 2-5. These models are readily available, with this particular model included here as an example only, hence, the skilled person will understand that other models may be implemented in the context of the present invention once the principle and teaching of the present invention is understood.

Glossary $1\_ABG_C$ First estimated or calculated arterial value
$2\_ABG$ Second reference arterial value
BB Buffer Base
BE Base Excess
DPG 2,3-disphosphoglycerate
FCOHb Fraction of Carboxyhaemoglobin
FMetHb Fraction of Methaemoglobin
GUI Graphical User Interface
Hb Haemoglobin
$HCO_3^-$ Bicarbonate ion
$PCO_2$ Partial pressure of carbon dioxide in the blood
$PO_2$ Partial pressure of oxygen in the blood
RQ Respiration Quotient
$SO_{2AE}$ Oxygen saturation in estimated arterial blood
$SO_{2AM}$ Oxygen saturation in measured arterial blood
$SpO_2$ Oxygen saturation measured by pulse oximetry
tCO2 Total carbon dioxide content
tO2 Total oxygen content
VBG Venous blood gas
$\Delta tCO_{2,T}$ Change in total $CO_2$ in blood related to tissue hypoxia
$\Delta BB_T$ Change in total Buffer Base related to tissue hypoxia

REFERENCES

1. J. Mallat et al., "Ratios of central venous-to-arterial carbon dioxide content or tension to arteriovenous oxygen content are better markers of global anaerobic metabolism than lactate in septic shock patients," Ann. Intensive Care, vol. 6, no. 1, pp. 1-9, 2016.
2. G. A. Ospina-Tascón, G. Hernández, and M. Cecconi, "Understanding the venous-arterial CO2 to arterial-venous O2 content difference ratio," Intensive Care Med., vol. 42, pp. 1801-1804, 2016.
3. G. A. Ospina-Tascón et al., "Combination of arterial lactate levels and venous-arterial CO2 to arterial-venous O2 content difference ratio as markers of resuscitation in patients with septic shock," Intensive Care Med., vol. 41, no. 5, pp. 796-805, 2015.
4. X. Monnet et al., "Lactate and venoarterial carbon dioxide difference/arterial-venous oxygen difference ratio, but not central venous oxygen saturation, predict increase in oxygen consumption in fluid responders," Crit. Care Med., vol. 41, no. 6, pp. 1412-1420, 2013.
5. WO 2004/010861 (to OBI Medical Aps, Denmark)
6. S. E. Rees et al., A method for calculation of arterial acid-base and blood gas status from measurements in the peripheral venous blood, 2006

All of the above patent and non-patent literature are hereby incorporated by reference in their entirety.

The invention can be implemented by means of hardware, software, firmware or any combination of these. The invention or some of the features thereof can also be implemented as software running on one or more data processors and/or digital signal processors i.e. data processing on one, or more, computers The individual elements of an embodiment of the invention may be physically, functionally and logically implemented in any suitable way such as in a single unit, in a plurality of units or as part of separate functional units. The invention may be implemented in a single unit, or be both physically and functionally distributed between different units and processors.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention.

Furthermore, individual features mentioned in different claims, may possibly be advantageously combined, and the mentioning of these features in different claims does not exclude that a combination of features is not possible and advantageous.

The invention claimed is:

1. A method of determining a degree of tissue hypoxia of a subject and treating a determined tissue hypoxia in the subject, the method comprising:
    determining venous blood values by at least one of measuring and estimating a blood acid-base status in a venous blood sample that has been obtained from the subject;
    providing a value of at least one of measured and estimated arterial oxygenation ($SO_{2AM}$, $SO_{2AE}$, $SpO_2$) from the subject;
    converting the venous blood values by applying a venous-to-arterial conversion model for deriving blood acid-base status and oxygenation status into first estimated arterial blood values ($1\_ABG_C$);
    providing second reference acid-base status and oxygenation values of arterial blood ($2\_ABG$) from the subject;
    implementing a tissue hypoxia model using at least one of a measure of the total buffer base concentration (BB) and a measure of the total carbon dioxide content ($tCO_2$) in the arterial blood, the model having as input, at least the first estimated arterial blood values ($1\_ABG_C$) and the second reference values of arterial blood ($2\_ABG$), wherein the tissue hypoxia model calculates at least one of:
        a first measure indicative of the change in the total buffer base concentration ($\Delta BB_T$) between the first estimated arterial blood values ($1\_ABG_C$) and the second reference values of arterial blood ($2\_ABG$); and
        a second measure indicative of the change in the total carbon dioxide content ($\Delta tCO_{2,T}$) between the first estimated arterial blood values ($1\_ABG_C$) and the second reference values of arterial blood ($2\_ABG$);

outputting, using the tissue hypoxia model, a measure indicative of the degree of tissue hypoxia of the subject using at least one of the first and second measures; and treating the subject according to the measure indicative of the degree of tissue hypoxia, the treating comprising at least one of increasing a flow of oxygen to the subject and increasing a ventilation rate to the subject.

2. The method according to claim 1, wherein the measure indicative of the degree of tissue hypoxia of the subject comprises the first measure ($\Delta BB_T$), the second measure ($\Delta tCO_{2,T}$) or any combinations thereof.

3. The method according to claim 1, wherein the tissue hypoxia model further performs a minimization process of the at least one first measure ($\Delta BB_T$) and second measure ($\Delta tCO_{2,T}$).

4. The method according to claim 3, wherein the minimization process of the at least one first measure ($\Delta BB_T$) and second measure ($\Delta tCO_{2,T}$), or a measure of the venous blood values that correspond to the acid-base status of the at least one first and second measures, is performed by an iteration process, preferably using a combined error function (ERROR) of the first and the second measure, or any measures of acid-base included in these measures.

5. The method according to claim 1, wherein the second reference arterial blood values from the subject are derived from a venous blood sample drawn from an extremity of the subject comprising at least one of a finger, an earlobe or other part where the venous blood sample is unlikely to have been modified by anaerobic metabolism.

6. The method according to claim 5, wherein second reference arterial blood values from the subject are derived by:
determining venous blood values by at least one of measuring and estimating a blood acid-base status in a blood sample (VBG) drawn from the subject;
providing values of at least one measured and/or estimated arterial oxygenation ($SO_{2AM}$, $SO_{2AE}$, $SpO_2$) from the subject; and
converting the venous blood values by applying a venous-to-arterial conversion model for deriving blood acid-base status and oxygenation status into second estimated arterial blood values (2_ABG).

7. The method according to claim 1, wherein the second reference arterial blood values from the subject are derived from an arterial blood sample while the subject is receiving oxygen from a ventilator under stable ventilator conditions.

8. The method according to claim 1, wherein the second reference arterial blood values from the subject are derived from an arterial blood sample while the subject is receiving oxygen from a ventilator under unstable ventilator conditions.

9. The method according to claim 1, wherein the tissue hypoxia model further receives third blood acid-base status and oxygenation reference values of arterial blood values (3_ABG) from the subject.

10. The method according to claim 1, wherein the venous blood values comprise at least one of pH, $pO_2$ and $pCO_2$.

11. A device for determining the degree of tissue hypoxia of a subject, the device comprising a processor configured to:
at least one of measure and estimate venous blood values that correspond to an acid-base status in a venous blood sample that has been obtained from the subject;
at least one of receive and provide a value of at least one of measured and estimated arterial oxygenation ($SO_{2AM}$, $SO_{2AE}$, $SpO_2$) from the subject;
convert venous blood values that correspond to the acid-base status by applying a venous-to-arterial conversion model for deriving blood acid-base status and oxygenation status into first estimated arterial blood values (1_$ABG_C$);
at least one of receive and provide second reference acid-base status and oxygenation values of arterial blood (2_ABG) from the subject;
implement a tissue hypoxia model using at least one of a total buffer base concentration (BB) and a total carbon dioxide content ($tCO_2$) in the arterial blood, the model having as input, at least, the first estimated arterial blood values (1_$ABG_C$), and the second reference values of arterial blood (2_ABG), the tissue hypoxia model configured to:
calculate a first measure indicative of the change in the total buffer base concentration ($\Delta BB_T$) between the first estimated arterial blood values (1_$ABG_C$) and the second reference values of arterial blood (2_ABG);
calculate a second measure indicative of the change in the total carbon dioxide content ($\Delta tCO_{2,T}$) between the first estimated arterial blood values (1_$ABG_C$) and the second reference values of arterial blood (2_ABG); and
adjust at least one of a ventilation rate and oxygen flow of an associated ventilator based on an output by the tissue hypoxia model to the device, wherein the output is displayed by the device and is indicative of the degree of tissue hypoxia of the subject using at least one of the first and second measures.

12. The device according to claim 11, wherein the associated ventilator is configured to provide at least one of ventilation and supplemental oxygen to the subject.

13. The device according to claim 12, further comprising a controller for controlling at least one of a ventilation rate and an oxygen flow from the associated ventilator to the subject.

14. The device according to claim 11, wherein the venous blood values comprise at least one of pH, $pO_2$ and $pCO_2$.

* * * * *